UNITED STATES PATENT OFFICE 2,547,219

INCREASING THE MELTING POINT OF POLYMERIZED ROSIN

Kenneth C. Laughlin, Wilmington, Del., assignor to Hercules Powder Company, Wilmington, Del., a corporation of Delaware No Drawing. Application August 18, 1949, Serial No. 111,099

8 Claims. (Cl. 260—99.5)

This invention relates to the fractionation of polymerized rosin and more particularly to a method for the separation of a fraction of increased melting point from polymerized rosin.

It is known to fractionate polymerized rosin by means of selective solvents and to separate a fraction having less tendency to crystallize. The process leaves much to be desired, however, as far as the production of a polymerized rosin of increased melting point is concerned. It is also known to obtain a polymerized rosin of higher state of polymerization by distilling off the oils and unpolymerized rosin to recover as the residue a dark-colored polymerized rosin of higher melting point. Such a product is of reduced acid number due to partial decarboxylation during the distillation process. This product, while higher melting in contrast to that of the product of the selective solvent process, is unsatisfactory for many uses because of its dark color and reduced acid number.

Now in accordance with this invention, it has been found that a polymerized rosin fraction, melting higher than the polymerized rosin from which it is obtained, is produced by extracting a polymerized rosin with a liquefied normally gaseous hydrocarbon having at least three carbon atoms, at a temperature within the range of about 50° C. and approximately the critical temperature of the hydrocarbon, and separating the portion insoluble in said hydrocarbon as a polymerized rosin of increased melting point.

The process of this invention is illustrated by the following examples in which all parts are parts by weight unless otherwise stated. All melting points were obtained by the Hercules drop method.

Example 1

To 908 parts pulverized polymerized rosin (melting point by drop method 100° C., acid number 151) was added 5448 parts propane in an autoclave fitted with a stirrer. The mixture was agitated at 90°±5° C. for 30 minutes and then allowed to settle for 30 minutes so that the insoluble fraction could settle out as the lower phase. The lower phase then was withdrawn and freed of occluded propane by distillation of the solvent. This fraction amounted to 87.2% of the original polymerized rosin. It had a melting point of 106° C. and an acid number of 154. The upper phase yielded on distilling off the solvent a viscous liquid.

A series of examples were carried out following the general procedure of Example 1. The data obtained on these examples are tabulated in Table I. In Example 3 the polymerized rosin used was the polymerized rosin obtained as the upper phase of Example 2. It was thus polymerized rosin which had already been freed of part of its high melting constituents. The combination of Examples 2 and 3 thus exemplifies a stepwise fractionation. In Example 5, the polymerized rosin treated was the higher melting polymerized rosin obtained from the lower phase of Example 4. The combination of Examples 4 and 5 exemplifies another stepwise purification procedure.

Table I

| Example | 1 | 2 | 3 | 4 | 5 | 6 | 7 |
|---|---|---|---|---|---|---|---|
| Polymerized Rosin (Weight) | 908 | 1,816 | 181 | 300 | 194 | 1,348 | 750 |
| Melting Point, °C | 100 | 100 | 72 | | 131 | 100 | 125 |
| Acid Number | 151 | 151 | 127 | | | 151 | 155 |
| Propane (Weight) | 5,448 | 5,448 | 1,588 | 5,448 | 2,270 | | |
| Butane (Weight) | | | | | | 5,448 | 3,632 |
| Fractionation Temperature, °C | 90 | 50 | 50 | 50 | 50 | 50 | 140 |
| Upper Phase per cent | 12.8 | 20.3 | 16.8 | 75–81 | | 22.5 | |
| Acid Number | 108 | 127 | 124 | 146 | | 105 | 159 |
| Melting Point, °C | | 72 | 57 | 85–92 | | | 109 |
| Lower Phase per cent | 87.2 | 79.7 | | 19–25 | 7 | 77.5 | 8.1 |
| Acid Number | 154 | 154 | 148 | 149–156 | 153 | 156 | 149 |
| Melting Point, °C | 106 | 113 | 90 | 131 | 141 | 109 | 146 |

The ratio of solvent to polymerized rosin used in the extraction process will vary with the particular normally gaseous hydrocarbon used and the degree of polymerization of the rosin. The solubility of the polymerized rosin increases with increasing molecular weight of the hydrocarbon and the ratio will, therefore, not be the same for all hydrocarbons. At least about three parts normally gaseous hydrocarbon solvent per part polymerized rosin is necessary to obtain effective separation and to avoid the solubilizing effects of the polymerized rosin constituents. Not more than about 20 parts normally gaseous hydrocarbon solvent per part polymerized rosin will normally be used since yields become too low for economical operation when a large excess of solvent is used.

The normally gaseous hydrocarbons useful in the fractionation process include propane, normal- and isobutanes and the normally gaseous pentanes. These may be used in pure form or in mixtures. The preferred hydrocarbon is propane but it may be used in admixture with butane, or the polymerized rosin may be dissolved in butane and propane added subsequently.

The polymerized rosins which may be fractionated by extraction with a normally gaseous liquefied hydrocarbon are made by treating a natural wood or gum rosin or tall oil rosin with a polymerizing agent such as volatile metal halides, as boron trifluoride, zinc chloride, stannic chloride, aluminum chloride, ferric chloride; mineral acids, as sulfuric acid, phosphoric acid; fuller's earth; hydrogen fluoride; acid salts, as sodium acid sulfate, etc.; hydrofluoroboric acid; etc., according to methods known to the art.

Although the process of this invention may be carried out on any polymerized rosin, it is preferably applied to those polymerized rosins having a drop melting point of at least 100° C., since it is particularly suitable for the production of polymerized rosin of melting points higher than is readily attainable by commercial methods.

The extraction process is preferably carried out on polymerized rosin in a dispersed state such as in powder form, or in the form of a fluid dispersed as droplets and the like. However, with polymerized rosin which tends to be gummy and not readily dispersible at extraction temperatures, the process is equally operable using a mixer of proper design. Simple propeller-type mixers are satisfactory for the readily dispersed polymerized rosins, and mixers giving a folding or kneading type of action are satisfactory where the polymerized rosin forms viscous, gummy, or dough-like mixtures with the liquefied normally gaseous hydrocarbon. Likewise, the process may be carried out on polymerized rosin rendered fluid and dispersible by a normally liquid volatile hydrocarbon such as pentanes, heptanes, gasoline, kerosene, benzene, toluene, or cymene. The volatile hydrocarbon can be distilled off for recovery of the nonvolatile residue extracted from the polymerized rosin.

The solubility of the components of polymerized rosin decreases with increase in temperature for the normally gaseous hydrocarbons and the solubility decreases more rapidly as the critical temperature is approached. Moreover, at the critical temperature, there is less difference in solubility of the polymerized and unpolymerized acids of the polymerized rosin but there is a large difference in solubility between the oils and the acid constituents. The oils may, therefore, be separated from the acid constituents by effecting the extraction substantially at the critical temperature. At temperatures below the critical temperature, unpolymerized rosin acids are extracted from the polymerized rosin acids, the degree of solubility of the unpolymerized rosin acids depending on the temperature. At temperatures within the range of about 50° C. and 15° to 20° below the critical temperature, the greatest difference in solubility between the polymerized and unpolymerized rosins obtains. To obtain a polymerized rosin of increased melting point by extraction of a fraction containing chiefly the oils and neutral constituents, the extraction is carried out substantially at the critical temperature. To remove also the unpolymerized constituents, the temperature may be within the range of about 50° C. and a temperature less than the critical temperature. By a two-step process, the oils may be removed first by extraction substantially at the critical temperature and the residual polymerized rosin may be extracted at a temperature below the critical temperature but above about 50° C.

The polymerized rosins of increased melting point made by the process of this invention may be subjected to any desirable subsequent treatment. Thus, for example, they may be subjected to refining treatments if it is desired to improve their color. The polymerized rosin may thus be dissolved in a high-boiling hydrocarbon solvent such as gasoline or kerosene and be treated with selective solvents for removal of the color bodies. Likewise, a solution of the polymerized rosin of this invention may be refined by means of adsorbents such as adsorbent earths.

What I claim and desire to protect by Letters Patent is:

1. The process of fractionating polymerized rosin which comprises extracting the polymerized rosin with a liquefied normally gaseous hydrocarbon having at least three carbon atoms, at a temperature within the range of about 50° C. and approximately the critical temperature of the hydrocarbon, and separating the portion insoluble in said hydrocarbon as a polymerized rosin of increased melting point.

2. The process of fractionating polymerized rosin which comprises mixing a dispersion of the polymerized rosin in a liquefied normally gaseous hydrocarbon having at least three carbon atoms, at approximately the critical temperature of the hydrocarbon until partial dissolution is effected, separating the resulting hydrocarbon solution, mixing the residual polymerized rosin with another portion of liquefied normally gaseous hydrocarbon at a temperature within the range of about 50° C. and a temperature substantially less than the critical temperature of the hydrocarbon until partial dissolution of the polymerized rosin is effected and separating the insoluble portion as a polymerized rosin of increased melting point.

3. The process of fractionating polymerized rosin which comprises mixing the polymerized rosin with liquefied propane at a temperature within the range of about 50° C. and approximately the critical temperature of the hydrocarbon until partial dissolution is effected and separating the insoluble portion as a polymerized rosin of increased melting point.

4. The process of fractionating polymerized rosin which comprises mixing the polymerized rosin in liquefied propane at a temperature within the range of about 50° C. and approximately the critical temperature of the hydrocarbon until partial dissolution is effected and separating the insoluble portion as a polymerized rosin of increased melting point.

5. The process of fractionating polymerized rosin which comprises mixing the polymerized rosin in liquefied propane at a polymerized rosin to propane ratio within the range of 1:3 and 1:20 at a temperature within the range of about 50° C. and approximately the critical temperature of the propane until partial dissolution is effected and separating the insoluble portion as a polymerized rosin of increased melting point.

6. The process of fractionating polymerized rosin which comprises mixing the polymerized rosin with liquefied butane at a temperature within the range of about 50° C. and approximately the critical temperature of the hydrocarbon until partial dissolution is effected and separating the insoluble portion as a polymerized rosin of increased melting point.

7. The process of fractionating polymerized rosin which comprises mixing the polymerized rosin in liquefied butane at a temperature within the range of about 50° C. and approximately the critical temperature of the hydrocarbon until partial dissolution is effected and separating the insoluble portion as a polymerized rosin of increased melting point.

8. The process of fractionating polymerized rosin which comprises mixing the polymerized rosin in liquefied butane at a polymerized rosin to butane ratio within the range of 1:3 and 1:20 at a temperature within the range of about 50° C. and approximately the critical temperature of the butane until partial dissolution is effected and separating the insoluble portion as a polymerized rosin of increased melting point.

KENNETH C. LAUGHLIN.

REFERENCES CITED

The following references are of record in the file of this patent:

UNITED STATES PATENTS

| Number | Name | Date |
| --- | --- | --- |
| 1,806,973 | Humphrey | May 26, 1931 |
| 2,142,592 | Waligora | Jan. 3, 1939 |
| 2,310,374 | Rummelsburg | Feb. 9, 1943 |